United States Patent Office 3,488,946
Patented Jan. 13, 1970

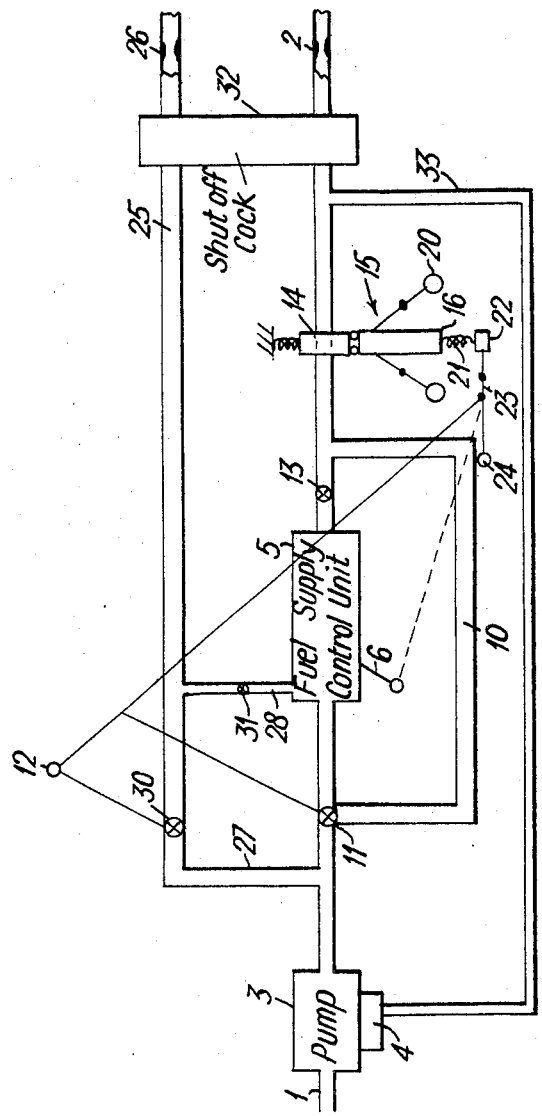

3,488,946
GAS TURBINE ENGINE FUEL SYSTEM
Albert Jubb, Derby, Christopher Linley Johnson, Allestree, Derby, and Hugh Francis Cantwell, Littleover, England, assignors to Rolls-Royce Limited, Derby, England, a British company
Filed Feb. 23, 1968, Ser. No. 707,703
Claims priority, application Great Britain, Mar. 20, 1967, 13,052/67
Int. Cl. F02c 9/08; F02g 3/00
U.S. Cl. 60—39.09
8 Claims

ABSTRACT OF THE DISCLOSURE

A gas turbine engine fuel system comprises a fuel conduit through which fuel may be supplied to engine burners; a fuel supply control unit which is connected in said fuel conduit to control fuel flow therethrough in accordance with the value of at least one engine variable; a by-pass passage which communicates with the fuel conduit upstream and downstream of the fuel supply control unit and which by-passes the latter; a fuel valve which controls the amount of fuel which may flow through the fuel conduit downstream of the downstream end of the by-pass passage; a range speed governor, which governs fuel flow throughout a range of different shaft speeds and which adjusts the fuel valve to control fuel flow past the latter in accordance with changes in the rotational speed of a main shaft of the said engine; valve means, operable by a control device, for selectively permitting and preventing fuel flow through the fuel supply control unit and for simultaneously preventing and permitting fuel flow through the by-pass passage; and means operable when fuel is prevented from flowing through the fuel supply control unit, for at least initially reducing fuel flow to the engine to prevent surging of the latter.

---

This invention concerns a gas turbine engine fuel system.

According to the present invention, there is provided a gas turbine engine fuel system comprising a fuel conduit through which fuel may be supplied to engine burners, a fuel supply control unit which is connected in said fuel conduit to control fuel flow therethrough in accordance with the value of at least one engine variable, a by-pass passage which communicates with the fuel conduit upstream and downstream of the fuel supply control unit and which by-passes the latter, a fuel valve which controls the amount of fuel which may flow through the fuel conduit downstream of the downstream end of the by-pass passage, a range speed governor, as hereinafter defined, which adjusts the fuel valve to control fuel flow past the latter in accordance with changes in the rotational speed of a main shaft of the said engine, valve means, operable by a control device, for selectively permitting and preventing fuel flow through the fuel supply control unit and for simultaneously preventing and permitting fuel flow through the by-pass passage, and means, operable when fuel is prevented from flowing through the fuel supply control unit, for at least initially reducing fuel flow to the engine to prevent surging of the latter.

The term "range speed governor" as used herein is to be understood to mean a governor which controls fuel flow throughout a range of different shaft speeds and does not merely control the top shaft speed.

Thus if the fuel supply control unit should fail, e.g. in a maximum flow or in a minimum flow condition, the pilot may operate the control device (or the latter may be operated automatically) so as to prevent the fuel from flowing through the fuel supply control unit, and metering of the fuel will nevertheless still be effected by reason of the control exercised by the said governor-adjusted fuel valve.

Preferably, the means for at least initially reducing fuel flow comprise means for altering the datum of the governor.

The control device may be connected to the means for at least initially reducing fuel flow to effect operation of the latter whenever the control device is set to prevent fuel from flowing through the fuel supply control unit.

Alternatively, the means for at least initially reducing the fuel flow may be connected to a pilot's throttle control on the fuel supply control unit, said pilot's throttle control being settable to vary the fuel flow through the fuel supply control unit.

Preferably there is a pilot fuel passage through which fuel may be supplied to pilot burners, the pilot fuel passage communicating with the said fuel conduit through first and second supply passages the flow through the latter only of which is controlled by the fuel supply control unit, and second valve means, operable by the said control device, are provided for selectively permitting and preventing fuel flow through the first supply passage simultaneously with fuel being respectively prevented from flowing and permitted to flow through the fuel supply control unit.

The second valve means may comprise an on-off valve in the first supply passage or in the pilot fuel passage upstream of the second supply passage, a non-return valve being provided in the second supply passage to permit fuel flow towards the pilot fuel passage only.

The first-mentioned valve means may comprise a two-way valve disposed at the junction of the fuel conduit with the upstream end of the by-pass passage, a non-return valve being provided in the fuel conduit downstream of the fuel supply control unit and upstream of the junction of the fuel conduit with a downstream end of the by-pass passage, the non-return valve permitting flow therethrough only in a direction away from the fuel supply control unit.

The invention is illustrated, merely by way of example, in the accompanying diagrammatic drawing which is a schematic sectional view of a gas turbine engine fuel system according to the present invention.

Referring to the drawing, a gas turbine engine fuel system comprises a fuel conduit 1 which is arranged to receive fuel from a fuel tank (not shown) by way of a backing pump (not shown), the fuel conduit 1 being arranged to deliver the fuel to main burners 2 of a gas turbine engine (not shown).

Connected in the fuel conduit 1 is a swash plate or other variable delivery high pressure pump 3. The output of the pump 3 is controlled by a servo device 4 which may, for example, comprise a piston (not shown) for adjusting the inclination of the swash plate of the pump 3.

A fuel supply control unit 5 is connected in the fuel conduit 1 downstream of the pump 3. The fuel supply control unit 5 controls fuel flow through the fuel conduit 1 in accordance with the values of engine variables such as ambient and compressor pressures or pressure ratios, ambient and jet pipe temperatures, and the rotational speed of a main shaft or shafts of the engine. The fuel supply control unit 5 is provided with a pilot's throttle control 6 which is settable to vary the fuel flow through the fuel supply control unit 5 to vary the thrust of the engine.

A by-pass passage 10, which by-passes the fuel supply control unit 5, communicates with the fuel conduit 1 both upstream and downstream of the fuel supply control unit 5. A two-way valve 11 is disposed at the junction of the fuel conduit 1 with the upstream end of the by-pass passage 10. The two-way valve 11 is settable mechanically or electrically by a control device 12 in two positions in one of which fuel is permitted to flow through the fuel supply control unit 5 but is prevented from flowing through the by-pass passage 10, and in the other of which fuel is permitted to flow through the by-pass passage 10 but is prevented from flowing through the fuel supply control unit 5.

A non-return valve 13 is provided in the fuel conduit 1 downstream of the fuel supply control unit 5 and upstream of the junction of the fuel conduit 1 with the downstream end of the by-pass passage 10. The non-return valve 13 permits flow therethrough only in a direction away from the fuel supply control unit 5.

Alternatively the non-return valve 13 could be replaced by an on-off valve (not shown) connected to the control device 12 to be respectively opened and closed when the two-way valve 11 respectively prevents and permits flow through the by-pass passage 10.

A fuel valve 14 is connected in the fuel conduit 1 to control the amount of fuel which may flow through the latter downstream of the downstream end of the by-pass passage 10. The fuel valve 14 is adjusted by a range speed governor 15. The latter comprises a shaft 16 which is driven (by means not shown) by a main shaft (not shown) of the engine, e.g. a shaft carrying a low pressure compressor and a low pressure turbine of the engine. The shaft 16 is axially movable to adjust the fuel valve 14 to control fuel flow past the latter in accordance with changes in the rotational speed of the said main shaft. Under normal operation of the fuel supply control unit 5, the range speed governor 15 is set to govern only the top speed of its associated main shaft.

The shaft 16 has governor weights 20 which, in operation, produce an axial force on the shaft 16 in opposition to that produced by a spring 21, the latter acting against a movable abutment 22. As will be appreciated, movement of the movable abutment 22 will alter the datum of the governor 15, the movable abutment 22 being movable by a lever 23 which is connected both to the control device 12 and to a pilot's lever 24.

The arrangement is such that, under normal operation of the fuel supply control unit 5, the fuel valve 14 is fully open and thus does not effect any control on the flow of fuel therethrough. However, when the pilot detects that a failure has occurred in the fuel supply control unit 5, he may operate the control device 12 to cause the two-way valve 11 to prevent fuel from flowing through the fuel supply control unit 5 but to permit the fuel to flow through the by-pass passage 10. When the control device 12 is so operated, it will adjust the movable abutment 22 to a minimum flow position in which the fuel valve 14 will reduce fuel flow to the engine. The reason it is necessary to reduce the fuel flow to the engine when operating the control device 12 is because if the fuel supply control unit 5 fails in a state of minimum fuel flow, the range speed governor would be in its maximum fuel flow position and if the fuel flow were not reduced when the pilot operated the control device 12 surging of the engine would result. Once the control device 12 has been operated metering of the fuel to the engine will, in effect, be taken over by the governor 15, which, as stated above, is a range speed governor i.e. a governor which controls fuel flow throughout the whole range of different shaft speeds and does not merely control the top shaft speed. The pilot will thus be able to control the fuel supply to the engine by appropriately setting the lever 24.

Alternatively, instead of connecting the control device 12 to the lever 23, and providing a lever 24, the lever 23 may be connected to the pilot's throttle control 6. In this case, if the fuel supply control unit 5 fails, the pilot will need to move the pilot's throttle control 6 to the idling position so as to avoid the possibility of surging, before operating the control device 12.

A pilot fuel passage 25, for supplying fuel to pilot burners 26, communicates with the fuel conduit 1 through supply passages 27, 28 of which the flow through the supply passage 28 only is controlled by the fuel supply control unit 5.

An on-off valve 30 is disposed either, as shown, in the pilot fuel passage 25 upstream of the supply passage 28, or in the supply passage 27. The on-off valve 30 is respectively opened and closed by the control device 12 to permit and prevent fuel flow through the supply passage 27 simultaneously with fuel being respectively prevented from flowing and permitted to flow through the fuel supply control unit 5.

A non-return valve 31 is provided in the supply passage 28 to permit fuel flow towards the pilot fuel passage 25 only. Alternatively, the non-return valve 31 could be replaced by an on-off valve (not shown) operated by the control device 12 so as to be respectively opened and closed when the on-off valve 30 is closed and opened.

A shut-off cock 32, which may be opened and closed (by means not shown), controls flow both through the fuel conduit 1, downstream of the fuel valve 14, and through the pilot fuel passage 25, downstream of the supply passage 28.

The servo device 4 is operated by the pressure of fuel in a line 33 which communicates with the fuel conduit 1 between the fuel valve 14 and the shut-off cock 32.

The system described above thus uses the governor 15 as an emergency fuel supply control unit, and the governor 15 should therefore desirably be of high accuracy and with a negligible possibility of failure. The said system, as described, will not of course cater for failure of the pump 3, but this risk may be provided for, if desired, by employing two pumps acting in parallel.

We claim:

1. A gas turbine engine fuel system comprising a fuel conduit through which fuel may be supplied to engine burners, a fuel supply control unit which is connected in said fuel conduit to control fuel flow therethrough in accordance with the value of at least one engine variable, a by-pass passage which communicates with the fuel conduit upstream and downstream of the fuel supply control unit and which by-passes the latter, a fuel valve which controls the amount of fuel which may flow through the fuel conduit downstream of the downstream end of the by-pass passage, a range speed governor, as hereinbefore defined, which adjusts the fuel valve to control fuel flow past the latter in accordance with changes in the rotational speed of a main shaft of the said engine, a control device, valve means, operable by said control device, for selectively permitting and preventing fuel flow through the fuel supply control unit and for simultaneously preventing and permitting fuel flow through the by-pass passage, and means operable when fuel is prevented from flowing through the fuel supply control unit, for at least initially reducing fuel flow to the engine to prevent surging of the latter.

2. A fuel system as claimed in claim 1 in which the means for at least initially reducing fuel flow comprise means for altering the datum of the governor.

3. A fuel system as claimed in claim 1 in which the control device is connected to the means for at least initially reducing fuel flow to effect operation of the latter whenever the control device is set to prevent fuel from flowing through the fuel supply control unit.

4. A fuel system as claimed in claim 1 in which the means for at least initially reducing the fuel flow is connected to a pilot's throttle control on the fuel supply control unit said pilot's throttle conrol being settable to vary the fuel flow through the fuel supply control unit.

5. A fuel system as claimed in claim 1 in which there is a pilot fuel passage through which fuel may be supplied to pilot burners, the pilot fuel passage communicating with the said fuel conduit through first and second supply passages to flow through the latter only of which is controlled by the fuel supply control unit, and second valve means, operable by the said control device, are provided for selectively permitting and preventing fuel flow through the first supply passage simultaneously with fuel being respectively prevented from flowing and permitted to flow through the fuel supply control unit.

6. A fuel system as claimed in claim 5 in which the second valve means comprises an on-off valve in the first supply passage or in the pilot fuel passage upstream of the second supply passage, a non-return valve being provided in the second supply passage to permit fuel flow towards the pilot fuel passage only.

7. A fuel system as claimed in claim 5 in which the second valve in the pilot fuel passage upstream of the second supply passage, a non-return valve being provided in the second supply passage to permit fuel flow towards the pilot fuel passage only.

8. A fuel system as claimed in claim 1 in which the first-mentioned valve means comprise a two-way valve, disposed at the junction of the fuel conduit with the upstream end of the by-pass passage, a non-return valve being provided in the fuel conduit downstream of the fuel supply control unit and upstream of the junction of the fuel conduit with the downstream end of the by-pass passage, the non-return valve permitting flow therethrough only in a direction away from the fuel supply control unit.

References Cited

UNITED STATES PATENTS

| | | | |
|---|---|---|---|
| 2,614,617 | 10/1952 | Bobier | 60—243 |
| 2,686,561 | 8/1954 | Isreeli et al. | 60—39.09 |
| 2,700,872 | 2/1955 | Lee | 60—39.28 |
| 2,830,436 | 4/1958 | Coar | 60—39.28 |

AL LAWRENCE SMITH, Primary Examiner

U.S. Cl. X.R.

60—39.28